United States Patent [19]
Swanberg

[11] Patent Number: 5,832,280
[45] Date of Patent: Nov. 3, 1998

[54] METHOD AND SYSTEM IN A DATA PROCESSING SYSTEM FOR INTERFACING AN OPERATING SYSTEM WITH A POWER MANAGEMENT CONTROLLER.

[75] Inventor: Randal Craig Swanberg, Round Rock, Tex.

[73] Assignee: International Business Machines Corporation, Armonk, N.Y.

[21] Appl. No.: 539,658

[22] Filed: Oct. 5, 1995

[51] Int. Cl.$^6$ .................................................. G06F 1/32
[52] U.S. Cl. ........................... 395/750.01; 395/750.05; 395/828; 395/829; 395/834
[58] Field of Search .................... 395/750, 828, 395/829–830, 834, 750.05, 750.08; 750/750.01

[56] References Cited

U.S. PATENT DOCUMENTS

| | | | |
|---|---|---|---|
| 5,014,193 | 5/1991 | Garner et al. | 395/830 |
| 5,167,024 | 11/1992 | Smith et al. | 395/375 |
| 5,175,853 | 12/1992 | Kardach et al. | 395/650 |
| 5,276,888 | 1/1994 | Kardach et al. | 395/725 |
| 5,301,276 | 4/1994 | Kimura | 395/829 |
| 5,317,693 | 5/1994 | Cuenod et al. | 395/829 |
| 5,379,431 | 1/1995 | Lemon et al. | 395/700 |
| 5,493,684 | 2/1996 | Gephardt et al. | 395/750 |
| 5,560,022 | 9/1996 | Dunstan et al. | 395/750 |

*Primary Examiner*—Jack B. Harvey
*Assistant Examiner*—Ario Etienne
*Attorney, Agent, or Firm*—Richard A. Henkler; Andrew J. Dillon

[57] ABSTRACT

In a data processing system having an operating system and a power management controller coupled to one or more power-managed devices, each of the power-managed devices is assigned a device identifier. An architected power-managed device select register and an architected power mode select register are provided within the data processing system. To modify a power mode of a power-managed device, the operating system writes a selected one of the device identifiers to the architected power-managed device select register for selecting an identified one of the power-managed devices. Thereafter, the operating system writes a power mode identifier to the architect power mode select register for selecting one of a plurality of power modes within the selected power-managed device. The device identifier and the power mode identifier are translated into control signals for the power management controller within the data processing system. Such control signals are then transmitted to the power management controller and the identified power-managed device is operated in the selected power mode, wherein the operating system controls the power modes of power-managed devices without programming a particular implementation of power management control in the operating system.

10 Claims, 5 Drawing Sheets

METHOD AND SYSTEM IN A DATA PROCESSING SYSTEM FOR INTERFACING AN OPERATING SYSTEM WITH A POWER MANAGEMENT CONTROLLER.

BACKGROUND OF THE INVENTION

1. Technical Field

The present invention relates in general to an improved data processing system, and in particular to an improved method and system for interfacing an operating system with a power management controller in a data processing system.

2. Description of the Related Art

The control of power consumption within a data processing system has become increasingly important, particularly since portable data processing systems that use a self-contained power source have become popular. Such a self-contained power source is typically a battery. In order to maximize the amount of data processing that may be done using the power stored in a reasonably sized battery, various functional units within the data processing system may be disconnected from the battery power source, or operated in a lower power consuming mode, until the full function of a particular unit is needed. Examples of such functional units include hard disk drives, floppy disk drives, modems, display devices, CD-ROM drives, and the like. Each of these devices may be designed to operate in a plurality of power modes. For example, a simple set of power modes may include a "power on" mode and a "power off" mode. Other power modes may include a low power mode that retains the state of the functional unit in memory, a low power mode that retains a partial state of the functional unit, and a low power mode that does not retain any state of the functional unit.

In the prior art, various integrated circuits, called power management controllers, control the power modes of one or more functional units within a data processing system. For example, one power management controller is sold under the part number "83C750" by Philips Components—Signetics, and another power management controller is sold under the part number "50753" by Mitsubishi Corporation. For more information on the 83C750, see the publication entitled "Philip Components—Signetics Products Specification".

Such power management controllers typically control the power supplied to various functional units within the data processing system, and may further control the frequency of a clock signal supplied to each functional unit in order to reduce the power consumed by that functional unit.

To control the power management unit, the operating system in the data processing system writes command words into control registers within the power management controller. Such control registers may be located at any address in addressable memory space that is reserved for input/output. Thus, an operating system in the prior art, which may be designed to operate on different hardware platforms, must be programmed to write to the power management control registers at the proper I/O address for each data processing system hardware platform. The operating system must be programmed in different ways to operate in different hardware platforms because each data processing system may include different functional units, and such functional units may be connected to the power management controller in different ways.

Furthermore, different power management controllers may require different commands and control signals to perform similar functions. This means that the operating system must also be programmed to operate the selected power management controller used in the design of the particular data processing system. Therefore, the problem in the prior art with using the operating system to control functional unit power modes is that the operating system must be particularly programmed for each different hardware platform that uses a power management controller. This means that prior art operating systems that manage power modes in functional units (i.e., power managed devices) are not truly portable between hardware platforms—some reprogramming of the operating system/power management controller interface is necessary.

SUMMARY OF THE INVENTION

It is therefore one object of the present invention to provide an improved data processing system.

It is another object of the present invention to provide a method and system for interfacing an operating system with a power management controller in a data processing system.

It is yet another object of the present invention to provide a method and system that enables a single operating system to operate in different hardware platforms having a different power management control design.

The foregoing objects are achieved as is now described. In a data processing system having an operating system and a power management controller coupled to one or more power-managed devices, each of said power-managed devices is assigned a device identifier. An architected power-managed device select register and an architected power mode select register are provided within the data processing system. To modify a power mode of a power-managed device, the operating system writes a selected one of the device identifiers to the architected power-managed device select register for selecting an identified one of the power-managed devices. Thereafter, the operating system writes a power mode identifier to the architect power mode select register for selecting one of a plurality of power modes within the selected power-managed device. The device identifier and the power mode identifier are translated into control signals for the power management controller within the data processing system. Such control signals are then transmitted to the power management controller and the identified power-managed device is operated in the selected power mode, wherein the operating system controls the power modes of power-managed devices without programming a particular implementation of power management control in the operating system.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
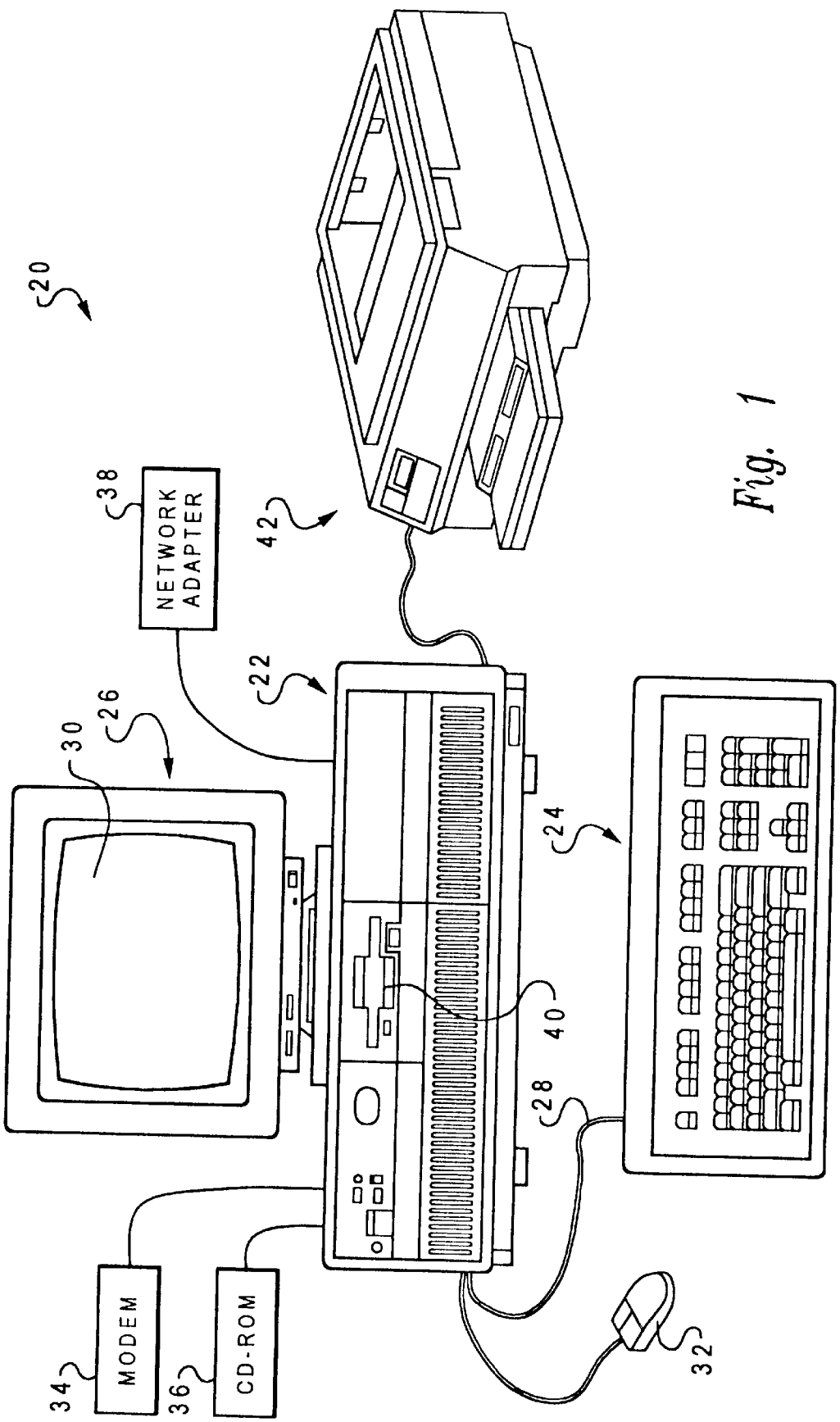
FIG. 1 depicts a data processing system in accordance with the method and system of the present invention.
Figure 2:
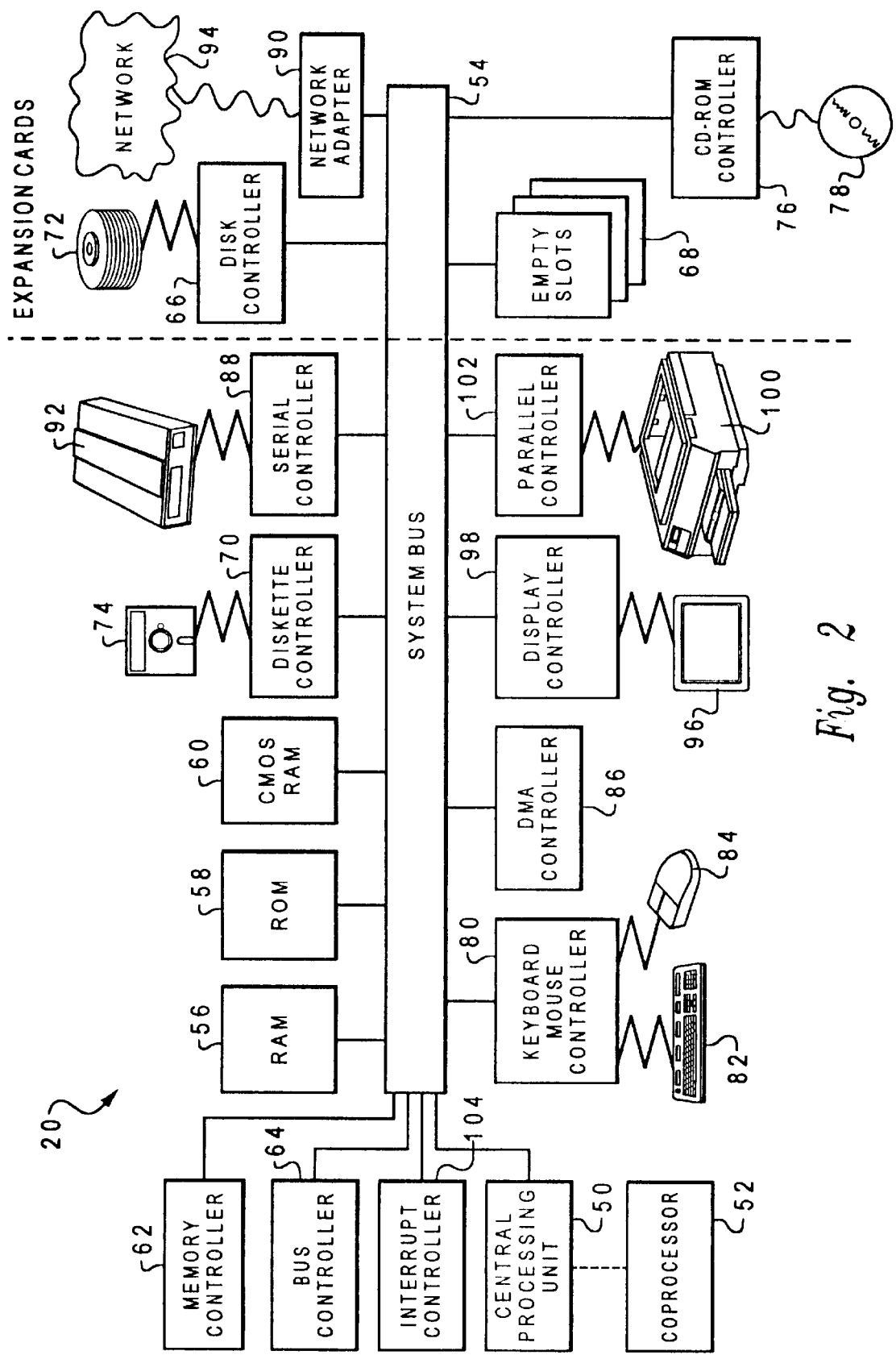
FIG. 2 is a high-level block diagram which further illustrates the major components of the data processing system of FIG. 1.

With reference now to the figures, and in particular to FIG. 1, there is depicted a data processing system 20, which includes processor 22, keyboard 24, and display 26. Keyboard 24 is coupled to processor 22 by a cable 28. Display 26 includes display screen 30, which may be implemented utilizing a cathode ray tube (CRT), a liquid crystal display (LCD), an electroluminescent panel, or the like. Data processing system 20 also includes pointing device 32, which may be implemented utilizing a track ball, joystick, touch sensitive tablet or screen, trackpad, or as illustrated in FIG. 2, a mouse. Pointing device 32 may be utilized to move a pointer or cursor on display screen 30. Processor 22 may also be coupled to one or more peripheral devices, such as modem 34, CD-ROM 36, network adaptor 38 and floppy disk drive 40, each of which may be internal or external to the enclosure of processor 22. An output device such as printer 42 may also be coupled to processor 22.

Those persons skilled in the art of data processing systems design should recognize that display 26, keyboard 24, and pointing device 32 may each be implemented utilizing any one of several known off-the-shelf components. Data processing system 20 may be implemented utilizing any general purpose computer or so-called personal computer that utilizes an operating system to control power modes of functional units in the computer through a power management controller. An example of such a general purpose computer is the computer sold under the trademark "RS/6000" by International Business Machines Corporation (IBM), of Armonk, N.Y. An example of such a personal computer is the personal computer sold under the trademark "PS/2".

With reference now to FIG. 2, there is depicted a high-level block diagram which further illustrates the major components that may be included in data processing system 20 of FIG. 1. Data processing system 20 is controlled primarily by computer readable instructions, which may be in the form of software, wherever, or by whatever means such software is stored or accessed. Such software may be executed within central processing unit (CPU) 50 to cause data processing system 20 to do work. In many known workstations and personal computers, such as the personal computer sold by IBM under the trademark "PS/2," central processing unit 50 is implemented by a single-chip CPU called a microprocessor. Examples of such microprocessors include the microprocessor sold under the trademark "PENTIUM" by Intel Corporation and the microprocessor sold under the trademark "PowerPC" by International Business Machines Corporation.

Coprocessor 52 is an optional processor, distinct from main CPU 50, that performs additional functions or assists CPU 50. One common type of coprocessor is the floating-point coprocessor, also called a numeric or math coprocessor, which is designed to perform numeric calculations faster and better than general-purpose CPU 50. Recently, however, the functions of many coprocessors have been incorporated into more powerful single-chip microprocessors.

CPU 50 fetches, decodes, and executes instructions, and transfers information to and from other resources via the computer's main data-transfer path, system bus 54. Such a system bus connects the components in data processing system 20 and defines the medium for data exchange. System bus 54 typically includes data lines for sending data, address lines for sending addresses, and control lines for sending interrupts and for operating the system bus. An example of such a system bus is the PCI (Peripheral Component Interconnect) bus and the bus sold under the trademark "Micro Channel Architecture" by IBM. The Micro Channel Architecture provides a function called bus arbitration that regulates access to the bus by extension cards, controllers, and CPU 50. Devices that attach to the Micro Channel and arbitrate to take over the bus are called bus masters. Bus master support also allows multiprocessor configurations of the Micro Channel to be created by the addition of bus master adapters containing a processor and its support chips.

Memory devices coupled to system bus 54 include random access memory (RAM) 56, read only memory (ROM) 58, and nonvolatile memory 60. Such memories include circuitry that allows information to be stored and retrieved. ROMs contain stored data that cannot be modified. Data stored in RAM can be read or changed by CPU 50 or other hardware devices. Nonvolatile memory is memory that does not lose data when power is removed from it. Nonvolatile memories include ROM, EPROM, flash memory, bubble memory, or battery-backed CMOS RAM. As shown in FIG. 2, such battery-backed CMOS RAM may be utilized to store system configuration information.

Access to RAM 56, ROM 58, and nonvolatile memory 60 may be controlled by memory controller 62 and bus controller 64. Memory controller 62 may provide an address translation function that translates virtual addresses into physical addresses as instructions are executed. Memory controller 62 may also provide a memory protection function that isolates processes within the system and isolates system processes from user processes. Thus, a program running in user mode can access only memory mapped by its own process virtual address space; it cannot access memory within another process's virtual address space unless memory sharing between the processes has been set up.

An expansion card or expansion board is a circuit board that includes chips and other electronic components connected in a circuit that adds functions or resources to the computer. Typical expansion cards add memory, disk-drive controllers 66, video support, parallel and serial ports, and internal modems. For laptop, palmtop, and other portable computers, expansion cards usually take the form of PC Cards, which are credit card-size devices designed to plug into a slot in the side or back of a computer. An example of such a slot is the PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special-purpose integrated circuits and associated circuitry that direct and control reading from and writing to a hard disk drive 72 and a floppy disk or diskette 74, respectively. Such disk controllers handle tasks such as positioning read/write head, mediating between the drive and the microprocessor, and controlling the transfer of information to and from memory. A single disk controller may be able to control more that one disk drive.

CD-ROM controller 76 may be included in data processing 20 for reading data from CD-ROMs 78 (compact disk read-only memory). Such CD-ROMs use laser optics rather than magnetic means for reading data.

Keyboard mouse controller 80 is provided in data processing system 20 for interfacing with keyboard 82 and a pointing device, such as mouse 84. Such pointing devices are typically utilized to control an on-screen element, such as a cursor, which may take the form of an arrow having a hot spot that specifies the location of the pointer when the user presses a mouse button. Other pointing devices include the graphics tablet, the stylus, the light pen, the joystick, the puck, the trackball, the trackpad and the pointing device sold under the trademark "TrackPoint" by IBM.

Direct memory access (DMA) controller 86 may be used to provide a memory access that does not involve CPU 50. Such memory accesses are typically employed for data transfer directly between memory and an "intelligent" peripheral device, such as between memory 56 and disk controller 66.

Communication between data processing system 20 and other data processing systems may be facilitated by serial controller 88 and network adaptor 90, both of which are coupled to system bus 54. Serial controller 88 is utilized to transmit information between computers, or between a computer and peripheral devices, one bit at a time over a single line. Serial communications can be synchronous (controlled by some time standard such as a clock) or asynchronous (managed by the exchange of control signals that govern the flow of information). Examples of serial communications standards include the RS-232 interface and the RS-422 interface.

As illustrated, such a serial interface may be utilized to communicate with modem 92. A modem is a communications device that enables a computer to transmit information over a standard telephone line. Modems convert digital computer signals to analog signals suitable for communication over telephone lines. Modem 92 may be utilized to connect data processing system 20 to an on-line information service, such as the information service provided under the service mark "PRODIGY" by IBM and Sears. Such on-line service providers may offer software which may be downloaded into data processing system 20 via modem 92. Modem 92 may provide a connection to other sources of software, such as a server, an electronic bulletin board, and the Internet or World Wide Web.

Network adaptor 90 may be used to connect data processing system 20 to a local area network 94. Network 94 may provide computer users with means of communicating and transferring software and information electronically. Additionally, network 94 may provide distributed processing, which involves several computers and the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with a CRT-based video display, an LCD-based flat-panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as a transparency. Other types of printers may include an imagesetter, a plotter, or a film recorder.

Parallel controller 102 is used to send multiple data and control bits simultaneously over wires connected between system bus 54 and another parallel communication device, such as printer 100. The most common parallel interface is the Centronics interface.

During data processing operations, the various devices connected to system bus 54 may generate interrupts which are processed by interrupt controller 104. An interrupt is a request for attention from CPU 50 that can be passed to CPU 50 by either hardware or software. An interrupt causes the microprocessor to suspend currently executing instructions, save the status of the work in progress, and transfer control to a special routine, known as an interrupt handler, that causes a particular set of instructions to be carried out. Interrupt controller 104 may be required to handle a hierarchy of interrupt priorities and arbitrate simultaneous interrupt requests. Interrupt controller 104 may also be used to temporally disable interrupts.

Figure 3:
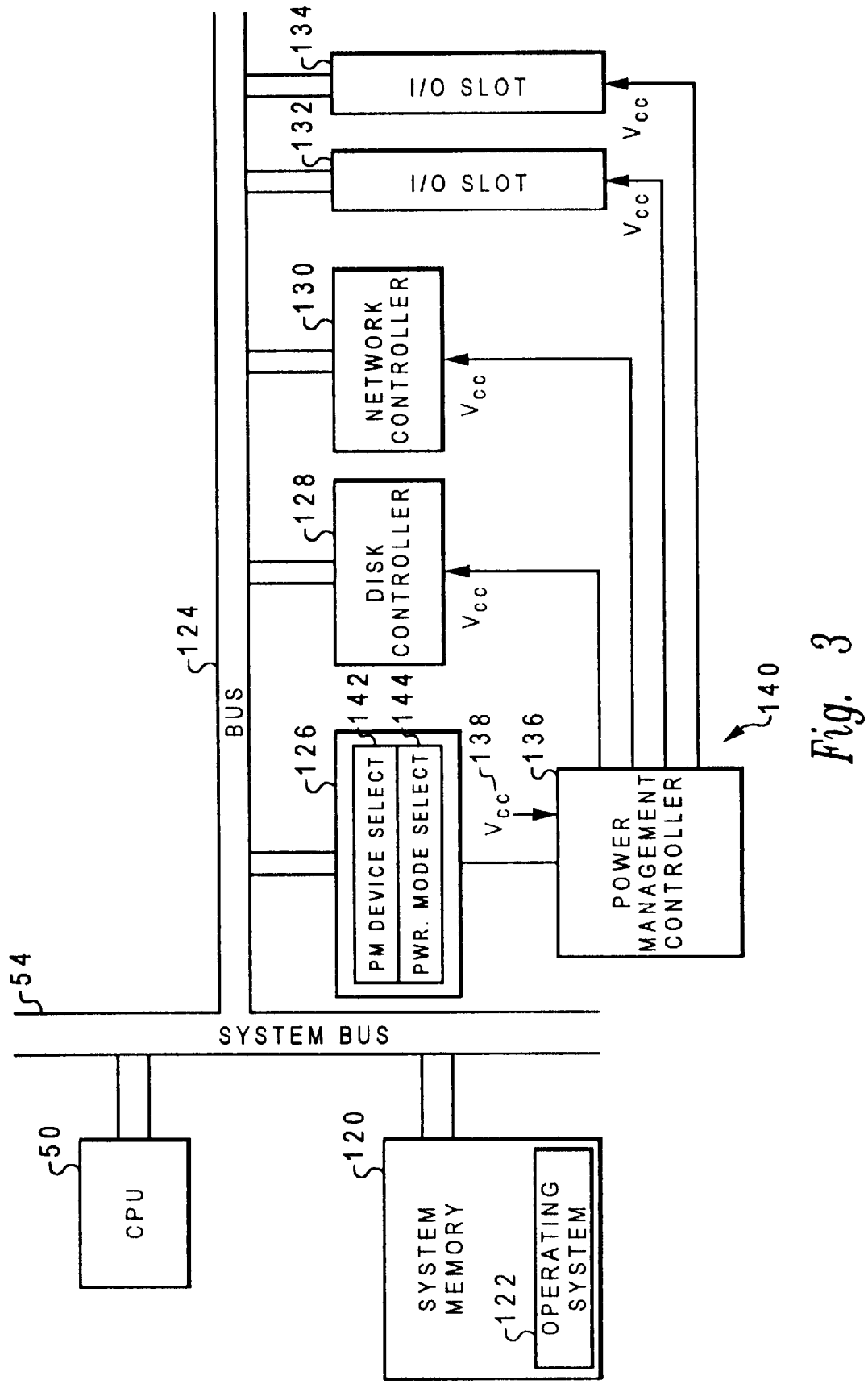
FIG. 3 is a high-level block diagram which further illustrates the configuration of a power management controller and power-managed devices within a data processing system in accordance with the method and system of the present invention.

With reference now to FIG. 3, there is depicted a high-level block diagram which further illustrates the configuration of a power management controller and power-managed devices within a data processing system in accordance with the method and system of the present invention. As illustrated, CPU 50 is connected to system bus 54. Also coupled to system bus 54 is system memory 120, which may be utilized to store at least a portion of operating system 122. Operating system 122 is the software responsible for controlling the allocation and usage of hardware resources such as memory, central processing unit (CPU) time, disk space, and peripheral devices or functional units. Operating system 122 is the foundation on which applications such as word-processing and spreadsheet programs are built. Examples of operating systems include the operating system sold under the trademark "MS-DOS" by Microsoft Corporation and the operating system sold under the trademark "AIX" by International Business Machines.

Also coupled to system bus 54 is bus 124 which may be an extension of system bus 54, or in some implementations may be an input/output bus such as a peripheral component interconnect (PCI) local bus. Together, buses 54 and 124 provide a data path from CPU 50, which runs operating system 122, to power management controller interface 126, disk controller 128, network controller 130, and I/O slots 132 and 134.

Disk controller 128 may be used to direct and control reading from and writing to a disk drive. Disk controller 128 may control either a floppy disk drive or a hard disk. According to an important aspect of the present invention, disk controller 128 is a power-managed device that is capable of operating in a plurality of power modes.

Network controller 130 is a device used to connect the data processing system to a network. Network controller 130 may include a network adapter for connecting the data processing system to a local area network, or may include a modem for connecting the data processing system to a standard telephone line. Network controller 130 is also a power-managed device that is capable of operating in a plurality of power modes.

I/O slots 132 and 134 are sockets inside the data processing system designed to hold expansion boards and connect them to bus 124. I/O slots 132 and 134 may be implemented by a PCMCIA slot designed to accept a PC Card. In accordance with the present invention, I/O slots 132 and 134 receive power-managed devices that are operable in a plurality of power modes.

Power management controller 136 is a circuit designed to control modes of operation in power-managed devices, such as devices 128 through 134. As illustrated, power management controller 136 receives power, as illustrated at reference 138 and distributes such power to power-managed devices 128 through 134 via power output pins 140. Power management controller 136 may be implemented with specialized power management controller integrated circuits that control power transistors that switch power to the power-managed devices. Power management controller 136 may also include circuitry that controls clock frequencies in power-managed devices, and circuitry that selectively provides power to sub-circuits within the power-managed devices. In one embodiment of the present invention, power management controller 136 may be implemented by the Signetics 83C750, which may be programmed with microcode to detect and process device identifier and power mode identifier information provided by operating system 122.

The power management controller interface 126 includes two architected registers for receiving data from operating system 122. These architected registers are implemented across platforms with the same I/O address and with the same bit definition so as to be binary compatible with the operting system on each platform that supports the operating system. Architected power-managed device select register 142 is the first architected register for receiving device identifier data from operating system 122. Architected power mode select register 144 is the second register which is used to receive power mode identifier data from operating system 122. These two registers may be located in addressable memory space in the I/O memory mapped region, or occupy locations in physical memory. Architected power-managed device select register 142 and architected power mode select register 144 are typically 32 bits wide.

In operation, power management controller interface 126 receives a device identifier in the architected power-managed device select register 142 and a power mode identifier in the architected power mode select register 144. Once this data is received from operating system 122, power management controller interface 126 translates the received data into control signals which may be used to control power management controller 136. As illustrated, power management controller interface 126 is coupled to power management controller 136 for sending such translated control signals to power management controller 136.

A translator that translates data in the architected power-managed device select register 142 and the architected power mode select register 144 into control signals for power management controller 136 may be implemented in several ways. In one implementation, microcode may be used to perform the translation. Such microcode may use the data from operating system 122 as inputs and recall a series of commands that are then sent to power management controller 136. In another embodiment, the translation function may be implemented in combinational logic, such as a programmable logic array.

Figure 4:
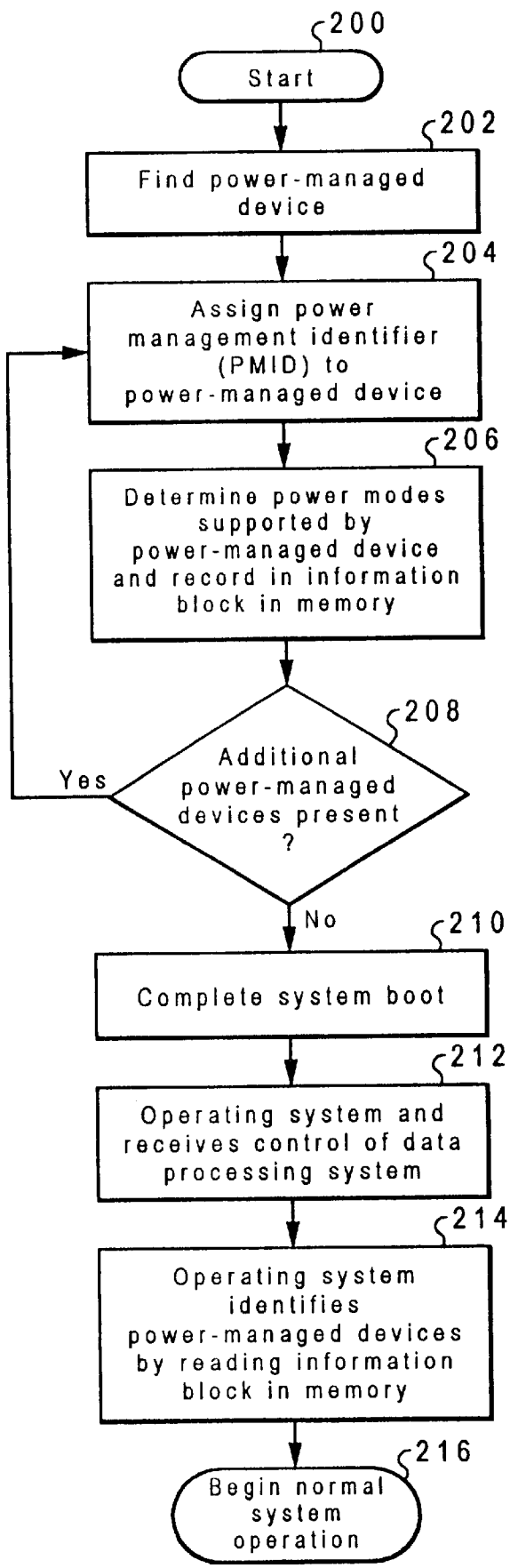
FIG. 4 depicts a high-level flowchart of the process of initializing the power management interface in the data processing system in accordance with the method and system of the present invention.

With reference now to FIG. 4, there is depicted a high-level flowchart of the process of initializing the power management interface in the data processing system in accordance with the method and system of the present invention. As illustrated, the process begins at block 200 and thereafter passes to block 202 wherein the system finds a power-managed device that is installed in data processing system 20. Finding a power-managed device within the data processing is typically a function of the boot firmware that is performed when the data processing system is booted. Booting the data processing system is the process of starting or resetting the computer.

Once a power-managed device is located, the system assigns a power management identifier (PMID) to the power-managed device as illustrated at block 204. This power management identifier may be unique among all PMIDs in the data processing system, or the assigned PMID may be the same PMID that is designed to other power-managed devices within a group of power-managed devices that will be operated in the same power mode at the same time. The PMID includes a number of bits necessary to assign unique PMIDs to all power-managed devices, or groups of power-managed devices, within the data processing system.

Next, the system determines what power modes are supported by the power-managed device that has just been located, as depicted at block 206. Power modes that may be supported by the power-managed device include: ON—all portions of the device are provided with full power; OFF—all portions of the device are powered off; LOW1—a low power mode that retains all logical states within the device; LOW2—a low power mode that retains selected logical states within the device; and LOW3—a low power mode that does not retain logical states within the device. In one embodiment of the present invention, the system may determine the power modes supported by the power-managed device by reading information stored in ROM by the system designer.

As is also depicted in block 206, the process records the power modes supported by the power-managed device in an information block in memory. Such an information block in memory may be later used by the operating system to determine the power modes supported by each power-managed device.

Next, the system determines whether or not additional power-managed devices are present within the data processing system, as illustrated at block 208. If additional power-managed devices are present, the process continues at block 204 by assigning a PMID to the next power-managed device.

If there are no additional power-managed devices present in the data processing system, the system boot operation is completed as depicted at block 210. Once the system has been booted, the operating system receives control of the data processing system from the boot firmware, as illustrated at block 212. The operating system then identifies the power-managed devices in the data processing system by reading the information block in memory, as depicted at block 214. And finally, normal data processing system operation begins as illustrated at block 216. Normal system operation includes executing various routines in the operating system and executing one or more application programs under the direction of a data processing system user or other system input.

Figure 5:
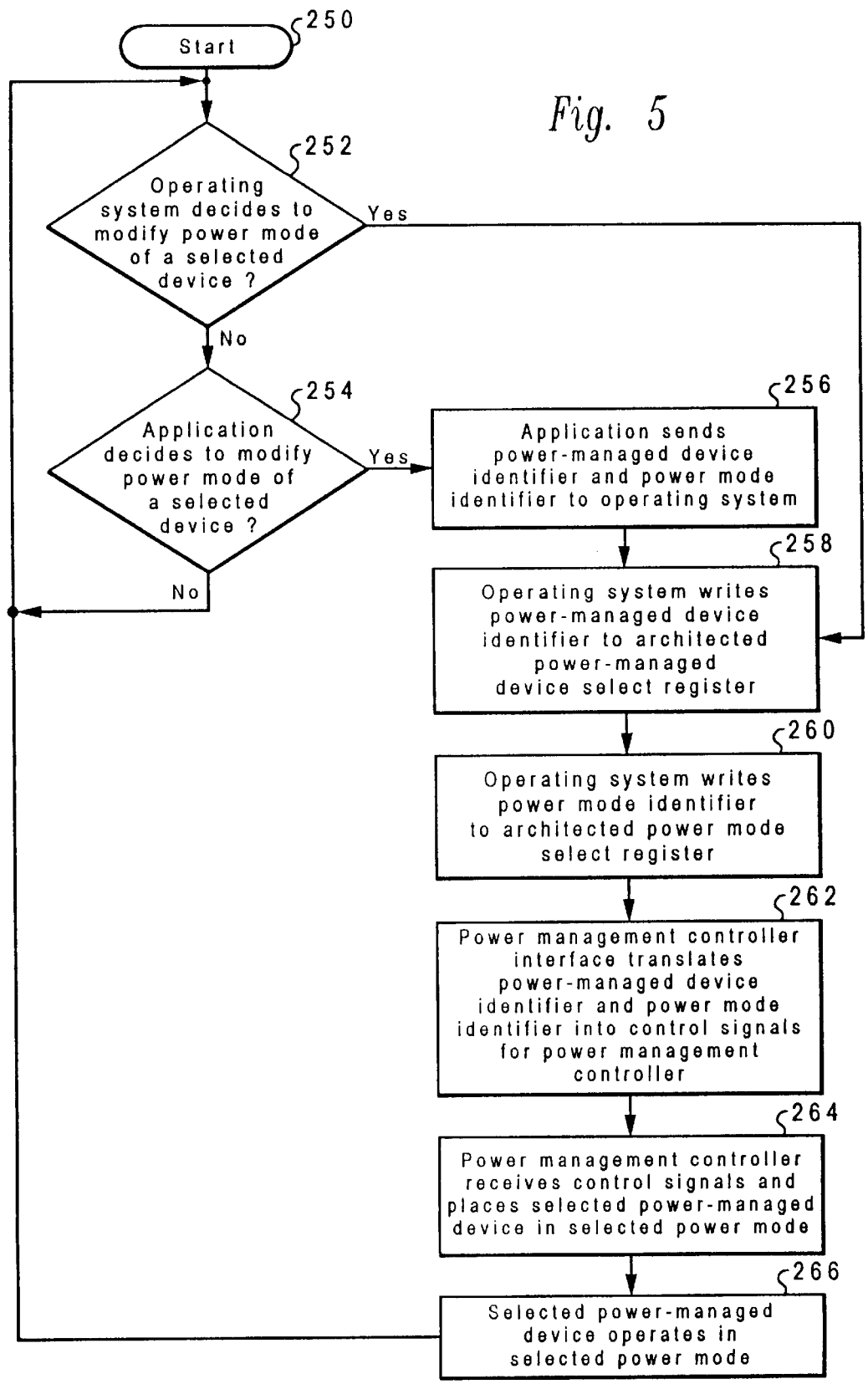
FIG. 5 depicts a high-level flowchart that illustrates the process of changing power modes in a power-managed device under the control of the operating system in accordance with the method and system of the present invention.

With reference now to FIG. 5, there is depicted a high-level flowchart that illustrates the process of changing power modes in a power-managed devices under the control of the operating system in accordance with the method and system of the present invention. As illustrated, the process begins at block 250 and thereafter passes to block 252 wherein the system determines whether or not the operating system decides to modify a power mode of a selected power-managed device. The operating system may decide to modify a power mode in a power-managed device in response to various conditions, including: determining that a particular power-managed device is not currently being used; determining that a power-managed device, such as a modem, has received an incoming signal, such as a ring signal, that indicates the device is needed; or receiving a command from an application that directs the operating system to place a particular power managed device in a particular power mode. Thus, the operating system may decide to modify the power mode of a selected power-managed device according to any command received by the operating system or any method of managing power consumption in the data processing system.

If the operating system has not decided to modify the power mode of a selected power-managed device, the system determines whether or not an application has decided to modify the power mode of a selected power-managed device, as depicted at block 254. If an application is not decided to modify the power mode of a power-managed device, the process iteratively returns to block 252 to await a decision to modify a power mode, as illustrated by the "NO" branch from block 254.

If an application has decided to modify a power mode of a power-managed device, the application sends a power-managed device identifier (PMID) and a power mode identifier to the operating system, as illustrated at block 256.

Referring again to block 252, if the operating system decides to modify the power mode of a power-managed device, or if an application has sent a PMID and a power mode identifier to the operating system, the operating system responds by writing the power-managed device identifier to an architected power-managed device select register, as depicted at block 258. Such an architected power-managed device select register is located in addressable memory space at the same location in each hardware platform designed to support the operating system.

Next, the operating system writes the power mode identifier to an architected power mode select register, as illustrated at block 260. As with the architected power-managed device select register, the architected power mode select register is located at the same address in addressable memory space in each hardware platform designed to run the operating system.

Next, the power management controller interface translates the power-managed device identifier in the architected power-managed device select register and the power mode identifier in the architected power mode select register into control signals for controlling the power management controller, as depicted at block 262. Such translation of data stored in the architected power-managed device select register and the architected power mode select register may be implemented in microcode, firmware, software, hardware, or the like. For example, utilizing microcode, the power mode identifier data may be matched with a power mode identifier in a look-up table, and a corresponding power mode command used by the power mode controller utilized in the data processing system may be selected, thereby translating the power mode identifier data into a power management controller command word. Similarly, a power-managed device identifier may be translated into a command that tells the power management controller what output pin a particular power-managed device is connected to. In another embodiment, such a translation function may be implemented in hardware with combinatorial logic that translates device select and power mode values (bit definitions) into appropriate control signals for the power management controller.

Next, the power management controller receives the control signals and places the selected power-managed device in the selected power mode as illustrated at block 264. Finally, the selected power-managed device is operated in the selected power mode, as depicted at block 266. The system then performs the process described above by returning to block 252 to await the next decision to modify a power mode of a selected power-managed device.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A method in a data processing system for interfacing an operating system with a power management controller, wherein said power management controller is coupled to one or more removable power-managed devices, and wherein each of said one or more removable power-managed devices is operable in a plurality of power modes, said method comprising the steps of:

automatically assigning a device identifier to each of said one or more removable power-managed devices detected within said data processing system in response to a starting of said data processing system;

providing an architected power-managed device select register within said data processing system;

providing an architected power mode select register within said data processing system;

writing a selected one of said device identifiers from said operating system to said architected power-managed device select register for selecting an identified one of said one or more removable power-managed devices;

writing a power mode identifier from said operating system to said architected power mode select register for selecting a selected one of said plurality of power modes;

translating said selected one of said device identifiers and said power mode identifier into control signals for said power management controller;

transmitting said control signals to said power management controller;

in response to receiving said control signals in said power management controller, operating said identified one of said one or more removable power-managed devices in said selected one of said plurality of power modes, wherein said operating system controls said power modes of said one or more removable power-managed devices without programming a particular implementation of said power management controller in said operating system.

2. The method in a data processing system for interfacing an operating system with a power management controller according to claim 1 wherein the steps of:

writing a selected one of said device identifiers from said operating system to said architected power-managed device select register; and writing a power mode identifier from said operating system to said architected power mode select register; include:

writing a selected one of said device identifiers from said operating system to said architected power-managed device select register in response to said operating system receiving a command from an application to operate a selected one of said one or more removable power-managed devices in a selected power mode; and writing a power mode identifier from said operating system to said architected power mode select register in response to said operating system receiving a command from an application to operate a selected one of said one or more removable power-managed devices in a selected power mode.

3. The method in a data processing system for interfacing an operating system with a power management controller according to claim 1 wherein the step of writing a power mode identifier from said operating system to said architected power mode select register for selecting a selected one of said plurality of power modes includes writing a power mode identifier from said operating system to said architected power mode select register for selecting a power-off mode.

4. The method in a data processing system for interfacing an operating system with a power management controller according to claim 1 wherein the step of writing a power mode identifier from said operating system to said architected power mode select register for selecting a selected one of said plurality of power modes includes writing a power mode identifier from said operating system to said architected power mode select register for selecting a power-on mode.

5. The method in a data processing system for interfacing an operating system with a power management controller according to claim 1 wherein said identified one of said one or more removable power-managed devices is operable in a power mode that preserves a logical state of said identified one of said one ore more removable power-managed devices while removing power from a portion of said identified one of said one or more removable power-managed devices, and wherein the step of writing a power mode identifier from said operating system to said architected power mode select register for selecting a selected one of said plurality of power modes includes writing a power mode identifier from said operating system to said architected power mode select register for selecting a power mode that preserves said logical state of said identified one of said one ore more removable power-managed devices while removing power from said portion of said identified one of said one or more removable power-managed devices.

6. A data processing system for interfacing an operating system with a power management controller, wherein said power management controller is coupled to one or more removable power-managed devices, and wherein each of said one or more power-managed devices is operable in a plurality of power modes, comprising:

means for automatically assigning a device identifier to each of said one or more removable power-managed devices detected within said data processing system in response to a starting of said data processing system;

means for providing an architected power-managed device select register within said data processing system, means for providing an architected power mode select register within said data processing system;

means for writing a selected one of said device identifiers from said operating system to said architected power-managed device select register for selecting an identified one of said one or more removable power-managed devices;

means for writing a power mode identifier from said operating system to said architected power mode select register for selecting a selected one of said plurality of power modes:

means for translating said selected one of said device identifiers and said power mode identifier into control signals for said power management controller;

means for transmitting said control signals to said power management controller;

means for operating said identified one of said one or more removable power-managed devices in said selected one of said plurality of power modes in response to receiving said control signals in said power management controller, wherein said operating system controls said power modes of said one or more removable power-managed devices without programming a particular implementation of said power management controller in said operating system.

7. The data processing system for interfacing an operating system with a power management controller according to claim 6 wherein said:

means for writing a selected one of said device identifiers from said operating system to said architected power-managed device select register; and means for writing a power mode identifier from said operating system to said architected power mode select register;

include;

means for writing a selected one of said device identifiers from said operating system to said architected power-managed device select register in response to said operating system receiving a command from an application to operate a selected one of said one or more removable power-managed devices in a selected power mode; and means for writing a power mode identifier from said operating system to said architected power mode select register in response to said operating system receiving a command from an application to operate a selected one of said one or more removable power-managed devices in a selected power mode.

8. The data processing system for interfacing an operating system with a power management controller according to claim 6 wherein said means for writing a power mode identifier from said operating system to said architected power mode select register for selecting a selected one of said plurality of power modes includes means for writing a power mode identifier from said operating system to said architected power mode select register for selecting a power-off mode.

9. The data processing system for interfacing an operating system with a power management controller according to claim 6 wherein said means for writing a power mode identifier from said operating system to said architected power mode select register for selecting a selected one of said plurality of power modes includes means for writing a power mode identifier from said operating system to said architected power mode select register for selecting a power-on mode.

10. The data processing system for interfacing an operating system with a power management controller according to claim 6 wherein said identified one of said one or more removable power-managed devices is operable in a power mode that preserves a logical state of said identified one of said one or more removable power-managed devices while removing power from a portion of said identified one of said one or more removable power-managed devices, and wherein said means for writing a power mode identifier from said operating system to said architected power mode select register for selecting a selected one of said plurality of power modes includes means for writing a power mode identifier from said operating system to said architected power mode select register for selecting a power mode that preserves said logical state of said identified one of said one or more removable power-managed devices while removing power from said portion of said identified one of said one or more removable power-managed devices.

* * * * *